United States Patent
Zhao et al.

(10) Patent No.: US 11,099,785 B2
(45) Date of Patent: Aug. 24, 2021

(54) LINKING ACCESS COMMANDS FOR A MEMORY SUB-SYSTEM

(71) Applicant: Micron Technology, Inc., Boise, ID (US)

(72) Inventors: Ning Zhao, Milpitas, CA (US); Yun Li, Fremont, CA (US); Scheheresade Virani, Frisco, TX (US); Zachary Andrew Pete Vogel, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/726,124

(22) Filed: Dec. 23, 2019

(65) Prior Publication Data

US 2021/0191652 A1 Jun. 24, 2021

(51) Int. Cl.
*G06F 3/06* (2006.01)
(52) U.S. Cl.
CPC .......... *G06F 3/0659* (2013.01); *G06F 3/0604* (2013.01); *G06F 3/0679* (2013.01)
(58) Field of Classification Search
CPC ..... G06F 3/0604; G06F 3/0659; G06F 3/0679
See application file for complete search history.

(56) References Cited

U.S. PATENT DOCUMENTS

| | | | |
|---|---|---|---|
| 2009/0106486 A1* | 4/2009 | Kim | G11C 16/349 711/103 |
| 2010/0057979 A1* | 3/2010 | Chu | G06F 12/0246 711/103 |
| 2010/0061207 A1* | 3/2010 | Trantham | G11B 27/36 369/53.1 |
| 2010/0174853 A1* | 7/2010 | Lee | G06F 12/0246 711/103 |
| 2011/0138106 A1* | 6/2011 | Prabhakaran | G06F 12/0804 711/103 |
| 2011/0276746 A1* | 11/2011 | Pruthi | G06F 12/0866 711/103 |
| 2014/0181364 A1* | 6/2014 | Berke | G06F 3/0604 711/103 |
| 2018/0165014 A1* | 6/2018 | Jiang | G06F 12/0804 |

* cited by examiner

*Primary Examiner* — Larry T MacKall
(74) *Attorney, Agent, or Firm* — Holland & Hart LLP (57) ABSTRACT

Methods, systems, and devices for linking access commands for a memory sub-system of a memory sub-system are described. A first write command that includes first data can be received. The first write command can be associated with a first identifier. An internal read command to retrieve data stored in the transfer unit of the memory sub-system can be issued based on receiving the first write command. A second write command that includes second data can be received. The second write command can be associated with a second identifier. The first and second identifiers can be linked based on receiving the second write command and an internal write command that includes the first data associated with the first write command and the second data associated with the second write command can be issued.

20 Claims, 5 Drawing Sheets

LINKING ACCESS COMMANDS FOR A MEMORY SUB-SYSTEM

TECHNICAL FIELD

The following relates generally to a memory sub-system and more specifically to linking access commands for a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various examples of the disclosure. The drawings, however, should not be taken to limit the disclosure to the specific examples, but are for explanation and understanding only.

DETAILED DESCRIPTION

Aspects of the present disclosure are directed to linking access commands for a memory sub-system of a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

The memory device can be a non-volatile memory device, which is a package of one or more dice. The dice in the packages can be assigned to one or more channels for communicating with a memory sub-system controller. An example of a non-volatile memory device is a negative-and (NAND) memory device. Other examples of non-volatile memory devices are described below in conjunction with FIG. 1.

The host system can initiate an access operation (e.g., write, read, erase, etc.) on a memory sub-system. The host system can send access requests (e.g., write command, read command) to the memory sub-system, such as to store data on a memory device at the memory sub-system and to read data from the memory device on the memory sub-system.

In traditional access operations of memory cells, such as NAND memory cells (e.g., NAND flash memory cells), commands can be transmitted from the host system to various dice on the memory sub-system. The commands can be associated with different access operations (e.g., read operations, write operations, etc.) to be performed on one or more transfer units (TUs). A TU can refer to a portion of data (e.g., 4$k$ of data) that can be written in a NAND device at one time. A TU can include one or more logical block addresses (LBAs), which LBAs may refer to a portion of data that can be written by the host system at one time. In some examples, the size of the TU and the size of the LBA may be different. Each LBA can be associated with a unique identifier (e.g., a systag). Thus the host system can transmit a command (e.g., a write command) to write one or more LBAs of a TU.

In some examples, a write operation may be associated with a subset of LBAs of a TU. In some NAND memory devices, data is accessed on a TU-by-TU basis. In such cases, if only a portion of LBAs of a TU are being accessed, the other non-accessed LBAs of the TU are also accessed. For example, to write data to one LBA of a TU, data stored at each LBA of the TU is read and "old" data (e.g., data previously stored to the NAND cell) stored in the target LBA can be overwritten with "new" data (e.g., data associated with the write operation), while the "old" data in the other LBAs is rewritten to the respective LBAs. Accordingly, traditional access operations (e.g., write operations) can result in an increased time and quantity of cycles to complete an access operation.

Aspects of the present disclosure address the above and other deficiencies to effectively align access commands at a TU level by linking identifiers (e.g., systags). For example, a memory sub-system can receive a write command associated with one or more LBAs of a TU. Upon receiving the command, the memory sub-system can allocate (e.g., store) the systag associated with the LBA and begin a read operation of the TU. The memory sub-system can then begin the issue an internal read command to retrieve the data of the TU and to overwrite the target LBA with the new data. The internal read operation, however, can take a number of cycles and during this time the memory sub-system can continue to receive write commands associated with the same TU. Instead of issuing internal read commands for each write command received from the host system, the memory sub-system can merge the write commands associated with a single TU during a given duration into a single internal write command. To perform the merging or linking, systags associated with the different write commands can be stored, for example, in a buffer of the memory sub-system. Each systag can be linked together so that each LBA of the TU can be written in a sequential order. If the memory sub-system does not receive a write command for a particular LBA of the TU, the systag associated with the data read from that TU (e.g., during the internal read operation of the TU) can be included. Once each LBA of the TU has been linked—either due to the memory sub-system receiving a write command or due to the read operation of the TU—the memory sub-system can generate a single internal write command for writing the TU. Issuing a single write command after linking the systags associated with a TU can allow for a single access operation (e.g., a single internal write operation) to be performed, which can reduce the time and quantity of cycles to complete the access operation.

Figure 1:
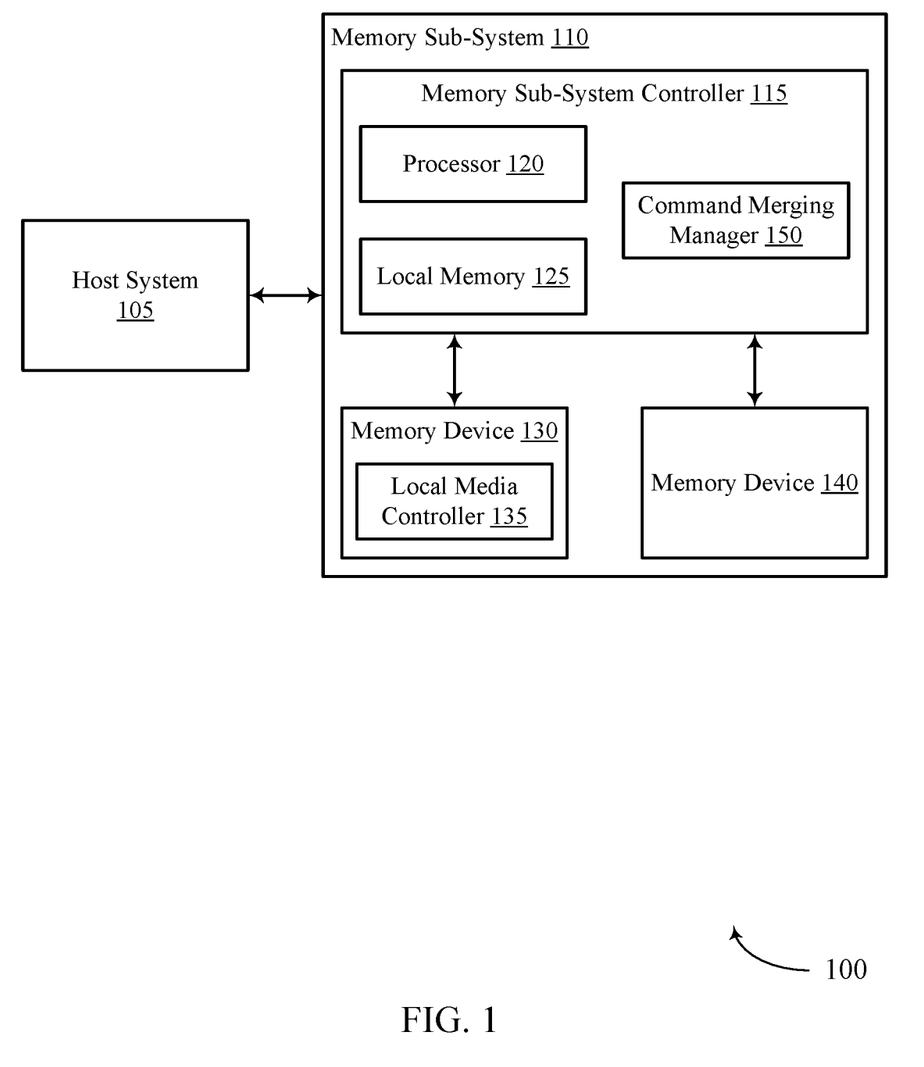
FIG. 1 illustrates an example computing system that includes a memory sub-system in accordance with some embodiments of the present disclosure.

FIG. 1 illustrates an example of a computing system 100 that includes a memory sub-system 110 in accordance with some embodiments of the present disclosure. The memory sub-system 110 can include media, such as one or more non-volatile memory devices (e.g., memory device 130), one or more volatile memory devices (e.g., memory device 140), or a combination thereof.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile DIMM (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 105 that is coupled with one or more memory sub-systems 110. In some examples, the host system 105 is coupled with different types of memory sub-systems 110. FIG. 1 illustrates one example of a host system 105 coupled with one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 105 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 105 uses the memory sub-system 110, for example, to write data to the memory sub-system 110 and read data from the memory sub-system 110.

The host system 105 can be coupled to the memory sub-system 110 using a physical host interface. Examples of a physical host interface include, but are not limited to, a serial advanced technology attachment (SATA) interface, a peripheral component interconnect express (PCIe) interface, USB interface, Fiber Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 105 and the memory sub-system 110. The host system 105 can further utilize an non-volatile memory Express (NVMe) interface to access components (e.g., memory devices 130) when the memory sub-system 110 is coupled with the host system 105 by the PCIe interface. The physical host interface can provide an interface for passing control, address, data, and other signals between the memory sub-system 110 and the host system 105. FIG. 1 illustrates a memory sub-system 110 as an example. In general, the host system 105 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic RAM (DRAM) and synchronous DRAM (SDRAM).

Some examples of non-volatile memory devices (e.g., memory device 130) includes a NAND type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as 3D cross-point array of non-volatile memory cells and NAND type flash memory (e.g., 2D NAND, 3D NAND) are described, the memory device 130 can be based on any other type of non-volatile memory, such as ROM, phase change memory (PCM), self-selecting memory, other chalcogenide based memories, ferroelectric transistor random-access memory (FeTRAM), ferroelectric RAM (FeRAM), magneto RAM (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable ROM (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), digital signal processor (DSP)), or another suitable processor.

The memory sub-system controller 115 can include a processor 120 (e.g., a processing device) configured to execute instructions stored in a local memory 125. In the illustrated example, the local memory 125 of the memory sub-system controller 115 includes an embedded memory configured to store instructions for performing various processes, operations, logic flows, and routines that control operation of the memory sub-system 110, including handling communications between the memory sub-system 110 and the host system 105.

In some examples, the local memory 125 can include memory registers storing memory pointers, fetched data, etc. The local memory 125 can also include ROM for storing micro-code. While the example memory sub-system 110 in FIG. 1 has been illustrated as including the memory sub-system controller 115, in another example of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 105 and can convert the commands or operations into instructions or appropriate commands to achieve the desired access to the memory devices 130. The memory sub-system controller 115 can be responsible for other operations such as wear leveling operations, garbage collection procedures, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 105 via the physical host interface. The host interface circuitry can convert the commands received from the host system into command instructions to access the memory devices 130 as well as convert responses associated with the memory devices 130 into information for the host system 105.

The memory sub-system 110 can also include additional circuitry or components that are not illustrated. In some examples, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some examples, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local media controller 135) for media management within the same memory device package. An example of a managed memory device is a managed NAND (MNAND) device.

The memory sub-system 110 includes a command merging manager 150 that links systags associated with a TU. In some examples, the command merging manager 150 links systags associated with a TU and issues the linked systags as a single command (e.g., a single internal command). For example, the host system 105 can transmit write commands to the memory sub-system 110. As the memory sub sub-system receives the commands, the linking manager can assign a systag associated with an LBA of the command to a buffer. Once stored in the buffer, the systags can be linked with other systags associated with different LBAs of the same TU. The other systags can be associated with write commands received by the memory sub-system and/or data read out from the TU during a read operation (e.g., an internal read operation). Once each systag of a TU is stored to the buffer and linked, the command merging manager 150 can issue a single command (e.g., an internal command) to conduct a single access operation (e.g., a single write operation), which can reduce the time and quantity of cycles to access the local memory 125.

In some examples, the memory sub-system controller 115 includes at least a portion of the command merging manager 150. For example, the memory sub-system controller 115 can include a processor 120 (e.g., a processing device) configured to execute instructions stored in local memory 125 for performing the operations described herein. In some examples, the command merging manager 150 is part of the host system 105, an application, or an operating system.

Figure 2:
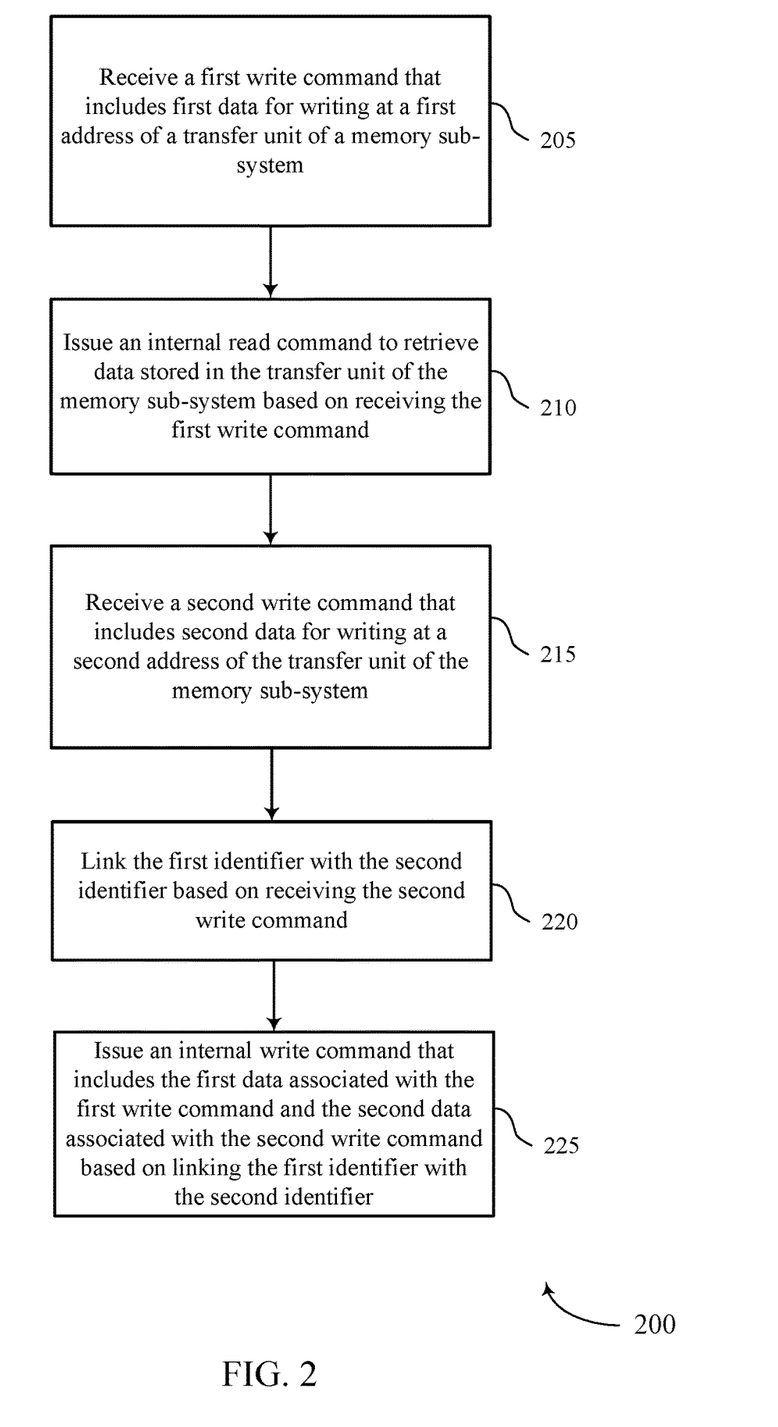
FIG. 2 is a flow diagram of an example method for linking access commands for a memory sub-system in accordance with some embodiments of the present disclosure.

FIG. 2 is a flow diagram of an example method 200 for linking access commands for a memory sub-system in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some examples, the method 200 is performed by the command merging manager 150 of FIG. 1. Although shown in a particular sequence or order, unless otherwise specified, the order of the processes can be modified. Thus, the illustrated examples should be understood only as examples, and the illustrated processes can be performed in a different order, and some processes can be performed in parallel. Additionally, one or more processes can be omitted in various examples. Thus, not all processes are required in every example. Other method flows are possible.

At operation 205, the processing logic receives a write command (e.g., a first write command) that includes data for writing at an address of a transfer unit of a memory sub-system. The write command can be associated with a first identifier. In some embodiments, the memory sub-system includes a buffer for storing transfer units. Information associated with the write command can be stored to the buffer. The processing logic can allocate identifiers to write commands based on the address of the respective transfer unit. For example, the processing logic can allocate the first identifier to the first write command based on the address of the respective transfer unit. The features and functions described herein that associated with the write command or a write operation can also be applied to other access operations access commands, memory operations, or memory operations, such as a read command, read operation, or others.

At operation 210, the processing logic issues an internal read command to retrieve data stored in the transfer unit of the memory sub-system based on receiving the write command. The internal read command can initiate an internal read operation that lasts for a duration.

At operation 215, the processing logic receives a write command (e.g., a second write command) that includes data for writing at an address of the transfer unit of the memory sub-system. The write command can be associated with a second identifier. The write command received at operation 215 can be received during a duration in which the internal read operation is occurring. In some embodiments, the write commands are associated with sequential logical block addresses of the transfer unit. The processing logic can store the data associated with the write commands (e.g., the first write command and the second write command) to the write buffer. The first identifier can be linked with the second identifier based on storing the respective data to the write buffer.

At operation 220, the processing logic links the first identifier with the second identifier based on receiving the write command (e.g., the second write command). The processing logic can compare an identifier (e.g., the second identifier) with the transfer units stored in the write buffer. The processing logic can determine that the identifier (e.g., the second identifier) is stored in the write buffer and can issue the internal read command based on determining that the identifier (e.g., the second identifier) is stored in the write buffer.

At operation 225, the processing logic issues an internal write command that includes the data associated with the write commands (e.g., the first write command and the second write command) based on linking the first identifier with the second identifier. The processing logic can issue the internal write command after identifying that the internal read operation is completed (e.g., after the duration of the internal read operation).

In some embodiments, the processing logic can receive an additional write command (e.g., a third write command) from a host system. The write command can include data for writing at an address of a transfer unit of the memory sub-system and can be associated with a third identifier. The processing logic can link the third identifier with the first identifier and the second identifier such that the internal write command includes data associated with the third identifier. In some embodiments, the processing logic can receive an additional write command for writing at an address of a different transfer unit (e.g., a second transfer unit) of the memory sub-system. The processing logic can issue the internal write command based on receiving the additional write command for writing at an address of the different transfer unit.

The processing logic can receive multiple write commands that include data for the memory sub-system after issuing the internal read command. The commands can each include data for writing at an address of a respective transfer unit and can each be associated with a respective identifier. The processing logic can link each of the respective identifiers with the first identifier and the second identifier based on receiving the write commands. the internal write command can include data associated with each of the write commands received. In some examples, each identifier includes a sequential address of the transfer unit.

Additionally or alternatively, the processing logic can allocate the second identifier to the second write command based on the address of the respective transfer unit. The processing logic can link the first identifier with the second identifier based on allocating the respective identifiers. In some embodiments, the processing logic identifies at least one identifier that is received in a non-sequential order. The processing logic can order each of the identifiers in a sequential order and can then link each of the identifiers accordingly.

Figure 3A:
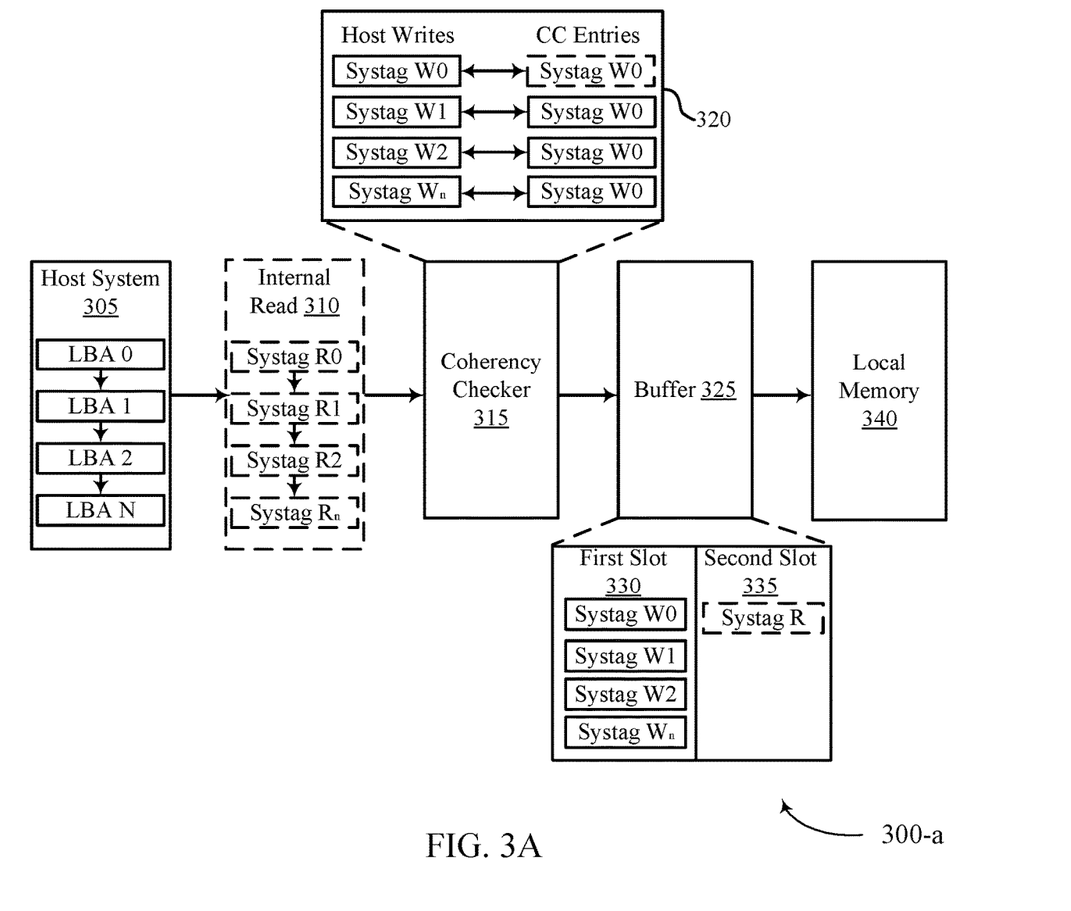
FIG. 3A is an example of system that supports linking access commands for a memory sub-system in accordance with some embodiments of the present disclosure.

FIG. 3A illustrates an example of a system 300-*a* that supports linking access commands for a memory sub-system in accordance with some embodiments of the present disclosure. The system can include a host system 305 that is configured to communicate with a memory sub-system. The memory sub-system can include a coherency checker 315, a buffer 325 (e.g., a write buffer 325), and local memory 340. The operations performed by the coherency checker can be performed by, for example, a local memory controller (i.e., the coherency checker 315 can be or can include a local memory controller). In some examples, the host system 305 can transmit a command (e.g., a write command) to the memory sub-system, and the components of the memory sub-system can link one or more identifiers associated with the command when performing the associated access operation. An identifier can be or can refer to a systag, which can identify various LBAs of a TU. For example, a TU can be associated with eight (8) LBAs, and each LBA can be associated with a unique identifier (e.g., systag). Linking identifiers associated with an access operation can allow for a single access operation (e.g., a single write operation) to be performed, which can reduce the time and quantity of cycles to complete the access operation. The features and functions described herein that associated with the write command or a write operation can also be applied to other access operations access commands, memory operations, or memory operations, such as a read command, read operation, or others.

The host system 305 can transmit a command to the memory sub-system. In some examples, the command can include a write command that includes data for writing at an address of the local memory 340. For example, the command can include data for writing at an address of a TU of the local memory 340. A TU can be a minimum access size for accessing a memory device (e.g., a NAND memory device such as local memory 340), and can include one or more LBAs, which can be associated with an identifier (e.g., a systag). In some examples, an LBA can refer to a minimum access size for the host system 305. Accordingly, when the host system 305 transmits a command to the memory sub-system, the command can include a single LBA of the TU. The system described herein is configured to allocate systags to LBAs of access commands and then merge those so that consecutive LBAs of a TU can be written in a single internal access operation.

For example, a single TU can include eight (8) LBAs. The LBAs can be consectuvely numbered (e.g., 0 through 7) and each LBA can be associated with a respective systag (e.g., systag W0 through W7). When the host system 305 transmits a command with a particular LBA, the memory sub-system can allocate a systag associated with the LBA. Regardless of the LBA's position within a TU, the memory sub-system can write the entire TU in a single write operation. That is, the memory sub-system is configured to link or merge consecutive systags (e.g., systag W0 through W7) so that an entire TU can be written regardless of the ordering of LBAs received by the host system 305.

When a write command is received from the host system 305, the data associated with the write command can be stored at a respective LBA of a TU (e.g., the TU can include data). In some examples, the memory sub-system can issue an internal read 310 to read out the data stored to each systag of the TU. Data read from the TU during an internal read 310 can be written back to the TU in a write operation when the host system 305 does not provide updated data for the respective systag. That is, a write command from the host system 305 may not include updated (e.g., new) data for each systag of the TU. Accordingly, the memory sub-system can link systags associated with the new data (e.g., from the host system 305) and the data previously stored to the TU. By linking the systags, a single internal write command can be used to write each LBA of the TU. The internal write command can be generated by the memory sub-system based on the write commands received from the host device. Thus an internal write command (or internal command) can refer to commands generated by the memory sub-system and/or commands issued to the local memory 340.

While some examples can include linking systags associated with data retrieved from the TU as part of an internal read operation, some examples can include merging slots of the buffer 325 based on the internal read operation. For example, during an internal read operation 310, data previously stored to one or more TUs can be stored to a particular buffer slot (e.g., second buffer slot 335). The stored data can later be merged (e.g., linked) with the systags stored in a different buffer slot (e.g., first buffer slot 330). Additionally or alternatively, other examples can include writing new data to each LBA of a TU. In such examples, an internal read 310 can still occur, but data read from the TUs may not be written (e.g., re-written) back to the TU in the access operation.

In some examples, the coherency checker 315 can determine whether the memory sub-system has received any commands associated with a TU. For example, when a write command associated with an LBA of a TU is received from the host system 305, the coherency checker 315 can determine whether the memory sub-system has received any other commands associated with the same TU. If the memory sub-system has not previously received commands associated with the same TU, the coherency checker 315 (or another component of the memory sub-system) can allocate a slot in the buffer 325 for linking systags associated with the TU. If the memory sub-system has previously received commands associated with the TU, the coherency checker 315 (or another component of the memory sub-system) can assign the systag to the allocated buffer slot for linking with related systags. That is, the systag can be assigned to a buffer where the systag can be linked with systags associated with new or previously written data (e.g., data from the internal read 310). Once the systags are linked, the associated data can be written to the TU. As discussed herein, the operations performed by the coherency checker 315 can be performed by, for example, a local memory controller (i.e., the coherency checker 315 can be or can include a local memory controller).

The coherency checker 315 may include a table 320 for comparing received LBAs (e.g., systags associated with received LBAs) and entries stored to the coherency checker 315. In some examples, the coherency checker 315 can store entries from previous access operations. When a write command is received (e.g., from the host system 305), the coherency checker 315 can compare a systag associated with the LBA of the write commands to systags stored to the table 320. For example, the coherency checker 315 can receive a write command associated with a first LBA of a TU (e.g., LBA 0). The LBA can be associated with a systag (e.g., systag W0). When the write command is received, the coherency checker 315 can compare systag W0 with other systags stored in the table to determine whether an access operation associated with the TU is ongoing. An ongoing access operation can refer to an access operation where the internal read operation 310 is not complete. That is, the internal read operation 310 can last for a duration and, during the duration, additional write commands can be received by the memory sub-system.

If the memory sub-system has not previously received commands associated with the same TU, a slot in the buffer 325 can be allocated for the received command. In some examples, the slot in the buffer 325 can be allocated by a memory controller (e.g., a local memory controller) or other component of the memory sub-system). If the memory sub-system has previously received commands associated with the TU, a component of the memory sub-system can allocate a slot in the buffer. Accordingly, if systag W0 is not included in the table, the memory sub-system can allocate a slot in the buffer 325. As additional LBAs associated with the same TU are received, the coherency checker 315 can utilize the table to determine whether an access operation associated with systag W0 is still ongoing. For example, the coherency checker 315 can compare systags associated with the same TU (e.g., systags, W1, W2, $W_n$) with systag W0. So long as systag W0 is located in the table 320 (and in the buffer 325), the systags associated with the same TU can be assigned to the buffer for linking.

In some examples, the buffer 325 can be utilized to link systags associated with write commands of LBAs of a single TU. To link the systags, multiple slots of the buffer 325 can be used. For example, a first slot 330 of the buffer 325 can store one or more systags associated with write commands for a same TU that are received from the host system 305. As the coherency checker 315 determines that an access operation associated with a same TU is ongoing, systags associated with the LBA can be assigned to first slot 330 of the buffer 325. In some examples, a second slot 335 of the buffer can store a systag associated with data read from a TU during an internal read 310. As the data is read from the TU, the data can be stored to second slot 335 and can be associated with Systag R. In some examples, the data can be stored as it is read (e.g., on a rolling basis) or the data can be stored selectively. That is, the data can be stored to second slot 335 only if it is to be used in the access operation. In some examples, when data read during an internal read 310 is used in the access operation, first slot 330 and second slot 335 of the buffer 325 can be merged. That is, the systag (e.g., Systag R) stored to second slot 335 can be combined with the systags stored to first slot 330. Accordingly, the merged systags can be linked (e.g., linked in a sequential order), and a single access operation can be performed on the TU. In some examples, the access operation can be performed on the local memory 340, which can include a plurality of memory cells (e.g., NAND memory cells).

By way of example, a single access operation can be performed on the local memory 340 according to Table 1, which is shown below. The access operation can be performed using the components and/or operations depicted with reference to the system 300-a as described with reference to FIG. 3A.

TABLE 1

| Command | LBA | Systag | CC Entry | Buffer Slot | Systags Link |
|---|---|---|---|---|---|
| Write | 0 | W0 | Miss, Add systag W0 | Allocate 1 | |

TABLE 1-continued

| Command | LBA | Systag | CC Entry | Buffer Slot | Systags Link |
|---|---|---|---|---|---|
| Internal Read | 0 | R | Hit, data not ready | Buffer slot R | Systag R; Systag W0; Systag R |
| Write | 1 | W1 | Sy stag W0 in CC | Buffer slot 2 | Systag R; Systag W0; Systag W1; Systag R |
| Write | 2 | W2 | Sy stag W0 in CC | Buffer slot 3 | Systag R; Systag W0; Systag W1; Systag W2; Systag R |
| Write | 3 | W3 | Sy stag W0 in CC | Buffer slot 4 | Systag R; Sy stag W0; Systag W1; Systag W2; Systag W3; Systag R |
| Write | 4 | W4 | Sy stag W0 in CC | Buffer slot 5 | Sy stag R; Systag W0; Systag W1; Systag W2; Systag W3; Systag W4; Systag R |
| Write | 5 | W5 | Sy stag W0 in CC | Buffer slot 6 | Systag R; Systag W0; Systag W1; Systag W2; Systag W3; Systag W4; Systag W5; Systag R |
| Write | 6 | W6 | Sy stag W0 in CC | Buffer slot 7 | Systag R; Systag W0; Systag W1; Systag W2; Systag W3; Systag W4; Systag W5; Systag W6; Systag R |
| Write | 7 | W7 | Sy stag W0 in CC | Buffer slot 8 | Systag R; Systag W0; Systag W1; Systag W2; Systag W3; Systag W4; Systag W5; Systag W6; Systag W7; Systag R |

The host system 305 can transmit a write command that includes data for writing at LBA 0 of the memory sub-system. In some examples, LBA 0 can be associated with Systag W0. When the memory sub-system receives the write command, the coherency checker 315 can determine whether any access commands associated with the TU (e.g., the TU that includes LBA 0) are ongoing. That is, the coherency checker 315 can compare LBA 0 with a plurality of systags stored at the table 320 to determine wither an associated systag (e.g., systag W0) is stored at the table. In this example, systag W0 may not be stored in the table 320, which may result in the memory sub-system allocating first slot 330 in the buffer 325 for linking systags.

Upon the coherency checker 315 determining that systag W0 is not stored to the table 320, the memory sub-system may begin an internal read 310 of the associated TU. During the internal read, systags associated with the TU (e.g., systag R) can be read and stored to second slot 335 of the buffer. Depending on the particular write commands received from the host system 305, these systags can be linked with the systags stored in first slot 330 of the buffer 325.

As shown in Table 1, the host system 305 may continue transmitting write commands to the memory sub-system. For example, host system 305 can transmit write commands associated with LBAs 1 through 7 to the memory sub-system. In some examples, the write commands may be received by the memory sub-system while the internal read 310 is ongoing. That is, the internal read 310 may last for a duration, and the memory sub-system may continue receiving write commands during the duration. As the memory sub-system receives write commands associated with LBAs 1 through 7, the coherency checker 315 can use the table 320 to determine that an access operation associated with a same TU is ongoing (e.g., by comparing the associated systags with systags stored to the table 320). The memory sub-system may assign the systags to first slot 330 of the buffer 325 based on the operations of the coherency checker 315.

After the host system 305 transmits a write command associated with LBA 7, and the associated systag is assigned to the buffer 325, the memory sub-system may not receive any more access commands associated with the TU. The memory sub-system may then link each systag associated with the LBAs of the TU. The systags may be linked by indicating (e.g., pointing) to a prior systag. For example, systag W3 (associated with LBA 3) can point to systag W2, which can point to systag W1, which can point to systag W0. Accordingly, when data is written to the TU, it can be written in sequential order (e.g., based the systag linking). The data associated with each systag may then be written to the TU of the local memory 340.

Figure 3B:
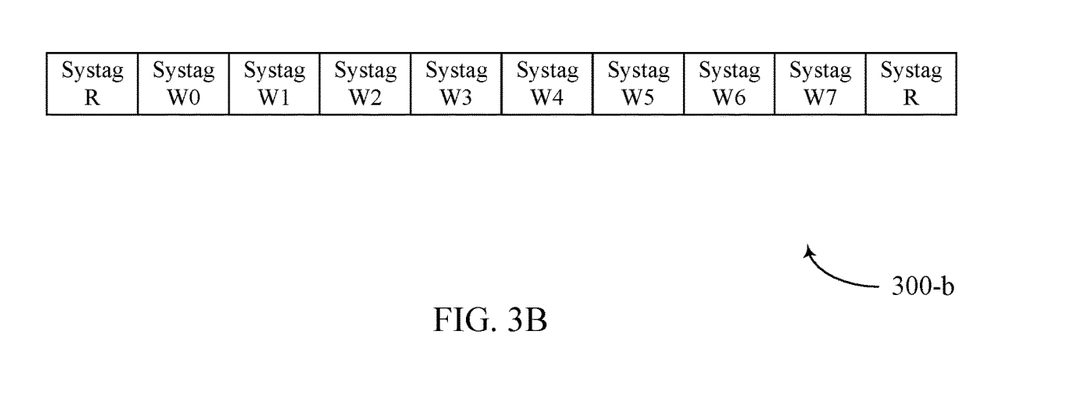
FIG. 3B is an example of linked systags that support linking access commands for a memory sub-system in accordance with some embodiments of the present disclosure.

FIG. 3B illustrates an example of linked systags 300-*b* that support linking access commands for a memory sub-system in accordance with some embodiments of the present disclosure. The systags can include systag R, and systag W0 through systag W7 as discussed with reference to FIG. 3A. In some examples, each systag is associated with an LBA of a TU. A TU can include, for example, eight (8) LBAs that correspond to systags W0 through W7.

As discussed with reference to FIG. 3A, the host system 305 can transmit a write command that includes data for writing at LBA 0 of the memory sub-system. In some examples, LBA 0 can be associated with Systag W0. When the memory sub-system receives the write command, the coherency checker 315 can determine whether any access commands associated with the TU (e.g., the TU that includes LBA 0) are ongoing. If systag W0 is not be stored in the table 320, the memory sub-system can allocate first slot 330 in the buffer 325 for linking systags.

The host system 305 may continue transmitting write commands to the memory sub-system (e.g., after transmitting data for LBA 0). For example, host system 305 can transmit write commands associated with LBAs 1 through 7 to the memory sub-system. In some examples, the write commands may be received by the memory sub-system while an internal read 310 is ongoing. As the memory sub-system receives write commands associated with LBAs 1 through 7, the coherency checker 315 can use the table 320 to determine that an access operation associated with a same TU is ongoing (e.g., by comparing the associated systags with systags stored to the table 320). The memory sub-system may assign the systags to first slot 330 of the buffer 325 based on the operations of the coherency checker 315.

In the example described with reference to FIG. 3A and shown in FIG. 3B, the memory sub-system may receive write commands for each of the LBAs of a TU (e.g., for LBA 0 through LBA 7). After allocating each of the associated systags to the buffer 325, the memory sub-system may link each systag associated with the LBAs of the TU. The systags may be linked in a sequential order, where each systag points to a previous systag in the chain. For example, FIG. 3B may illustrate the received (and linked) commands, where Systags W0 through W7 are linked in a sequential order. Accordingly, systag W7 can point to systag W6, which can point to systag W5, and so on. In some examples, the linked systags can include Systag R, which can be associated with the internal read operation 310. The linked list can be a circular linked list such that Systag R is linked with Systag W0 and Systag W7. In the event that the host system 305 does not transmit a write command for a particular LBA, the data can be read from the TU (e.g., during an internal read operation 310) and written to the TU due to Systag R being included in the linked list. In some examples, even if the host system 305 transmits a write command for each LBA, the Systag R can still be included (e.g., linked with Systag W0 and Systag W7).

After each of the systags are linked, a single access command can be issued (e.g., an internal access command; an internal write command) and the data associated with each systag may then be written to the TU of the local memory 340. As described below with reference to FIGS. 4A and 4B, systags can also be received in a non-sequential order.

Figure 4A:
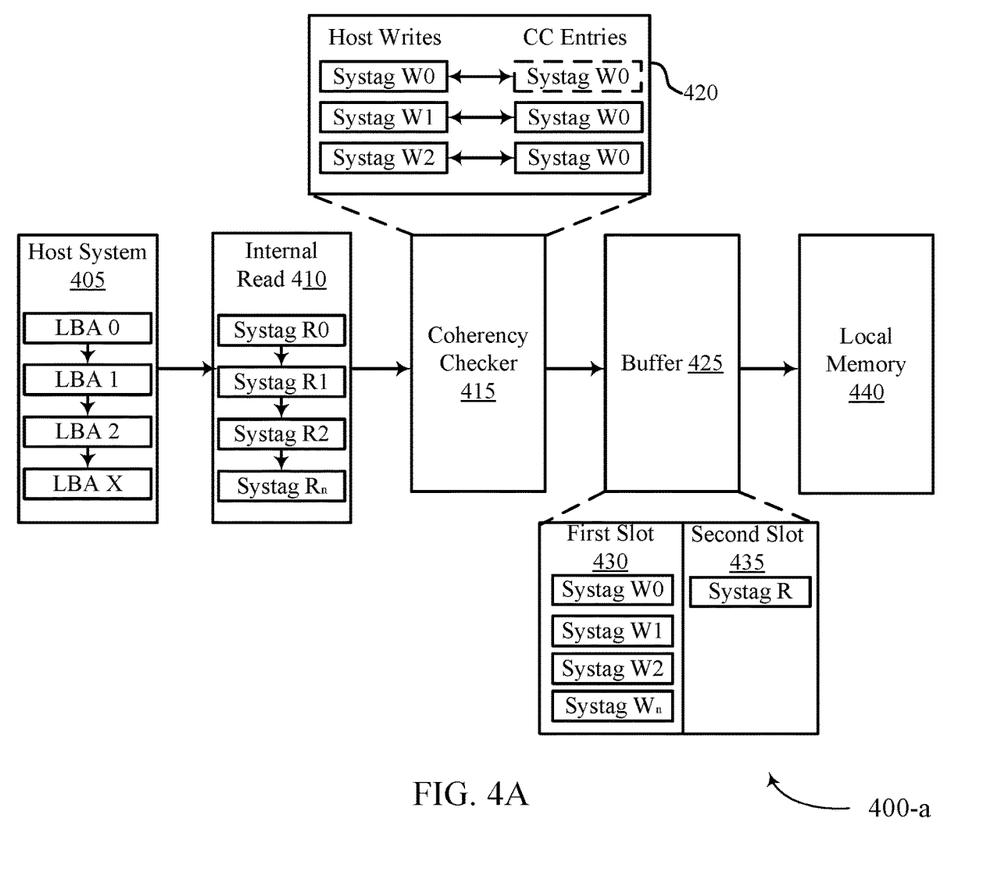
FIG. 4A is an example of system that supports linking access commands for a memory sub-system in accordance with some embodiments of the present disclosure.

FIG. 4A illustrates an example of a system 400-a that supports linking access commands for a memory sub-system in accordance with some embodiments of the present disclosure. The system can include a host system 405 that is configured to communicate with a memory sub-system. The memory sub-system can include a coherency checker 415, a buffer 425 (e.g., a write buffer 425), and local memory 440. The host system 405, coherency checker 415, buffer 425, and local memory 440 can be examples of the host system 305, coherency checker 315, buffer 325, and local memory 340 as described with reference to FIG. 3. The operations performed by the coherency checker can be performed by, for example, a local memory controller (i.e., the coherency checker 415 can be or can include a local memory controller). In some examples, the host system 405 can transmit a command (e.g., a write command) to the memory sub-system, and the components of the memory sub-system can link one or more identifiers associated with the command when performing the associated access operation. An identifier can be or can refer to a systag, which can identify various LBAs of a TU. For example, a TU can be associated with eight (8) LBAs, and each LBA can be associated with a unique identifier (e.g., systag). Linking identifiers associated with an access operation can allow for a single access operation (e.g., a single write operation) to be performed, which can reduce the time and quantity of cycles to complete the access operation.

The host system 405 can transmit a command to the memory sub-system. In some examples, the command can include a write command that includes data for writing at an address of the local memory 440. For example, the command can include data for writing at an address of a TU of the local memory 440. As discussed herein, a TU can be a minimum access size for accessing a memory device (e.g., a NAND memory device such as local memory 440) and can include one or more LBAs, which can be associated with an identifier (e.g., a systag). Accordingly, when the host system 405 transmits a command to the memory sub-system, the command can include a single LBA of the TU. The system described herein is configured to link systags associated with consecutive LBAs of a TU so that the entire TU (e.g., each LBA of the TU) can be written in a single access operation. In the example shown with reference to FIG. 4, the host system 405 can transmit write commands for non-sequential LBAs of the TU and/or transmit a write command for a subset of the LBAs of the TU. That is, the host system 405 can transmit a write command for a quantity of LBAs that is less than the total quantity of LBAs of a TU.

In some examples, the data associated with the write command can be stored at a respective LBA of a TU (e.g., the TU can include data). In some examples, the memory sub-system can issue an internal read 410 to read out the data stored to each systag of the TU. Data read from the TU during an internal read 410 can be written back to the TU in a write operation when the host system 405 does not provide updated data for the respective systag. That is, a write command from the host system 405 may not include updated (e.g., new) data for each systag of the TU. Accordingly, the memory sub-system can link systags associated with the new data (e.g., from the host system 405) and the data previously stored to the TU. By linking the systags, a single write command can be used to write each LBA of the TU. In some examples, the internal read 410 can occur until data from each of the LBAs of a TU are read.

In some examples, the coherency checker 415 can determine whether the memory sub-system has received any commands associated with a TU. For example, when a write command associated with an LBA of a TU is received from the host system 405, the coherency checker 415 can determine whether the memory sub-system has received any other commands associated with the same TU. If the memory sub-system has not previously received commands associated with the same TU, a memory controller (e.g., a local memory controller) or another component of the memory sub-system can allocate a slot in the buffer 425 for linking systags associated with the TU. If the memory sub-system has previously received commands associated with the TU, the memory sub-system can assign the systag to the allocated buffer slot for linking with related systags. That is, the systag can be assigned to a buffer where the systag can be linked with systags associated with new or previously written data (e.g., data from the internal read 410). Once the systags are linked, the associated data can be written to the TU. As discussed herein, the operations performed by the coherency checker 415 can be performed by, for example, a local memory controller (i.e., the coherency checker 415 can be or can include a local memory controller).

The coherency checker 415 may include a table 420 for comparing received LBAs (e.g., systags associated with received LBAs) and entries stored to the coherency checker 415. In some examples, the coherency checker 415 can store entries from previous access operations. When a write command is received (e.g., from the host system 405), the coherency checker 415 can compare a systag associated with the LBA of the write commands to systags stored to the table 420. For example, the coherency checker 415 can receive a write command associated with a first LBA of a TU (e.g., LBA 0). The LBA can be associated with a systag (e.g., systag W0). When the write command is received, the coherency checker 415 can compare systag W0 with other systags stored in the table to determine whether an access operation associated with the TU is ongoing. An ongoing access operation can refer to an access operation where the internal read operation 310 is not complete. That is, the internal read operation 310 can last for a duration and, during the duration, additional write commands can be received by the memory sub-system.

In some examples, the buffer 425 can be utilized to link systags associated with LBAs of a TU. To link the systags, multiple slots of the buffer 425 can be used. For example, first slot 430 of the buffer 425 can store systags associated with write commands for a same TU that are received from the host system 405. As the coherency checker 415 determines that an access operation associated with a same TU is ongoing, systags associated with the LBA can be assigned to first slot 430 of the buffer 425. In some examples, second slot 435 of the buffer can store a systag associated with data read from a TU during an internal read 410. As the data is read from the TU, the data can be stored to second slot 435 and can be associated with Systag R. In some examples, the data can be stored as it is read (e.g., on a rolling basis) or the data can be stored selectively. That is, the data can be stored to second slot 435 only if it is to be used in the access operation. In some examples, when data read during an internal read 410 is used in the access operation, first slot 430 and second slot 435 of the buffer 425 can be merged.

That is, the systag (e.g., Systag R) stored to second slot 435 can be combined with the systags stored to first slot 430. Accordingly, the merged systags can be linked (e.g., linked in a sequential order), and a single access operation can be performed on the TU. In some examples, the access operation can be performed on the local memory 440, which can include a plurality of memory cells (e.g., NAND memory cells).

In some examples, the coherency checker 415 can continue determining whether received commands are associated with ongoing access commands. Each time a command (e.g., a write command) is received, the coherency checker 415 can compare the systag associated with the LBA to the systags stored in the table 420. In some examples, when a systag is received that is not associated with an LBA of an ongoing access operation, the coherency checker 415 can indicate (e.g., to a local memory controller) that the buffer slots 430 and 435 should be merged and the internal write command should be issued. For example, when a systag is received that is not associated with an LBA of an ongoing access operation, the coherency checker 415 can indicate that the systags in first slot 430 of the buffer 425 should be merged with the systag in second slot 435 of the buffer 425 (e.g., after the internal read 410 is completed). Accordingly, data received in the commands from the host device 405 and data read out from the TU during the internal read 410 can be written to the local memory 440 in a single write command (e.g., in a single internal command).

By way of example, a single access operation can be performed on the local memory 440 according to Table 2, which is shown below. The access operation can be performed using the components and/or operations depicted with reference to the system 400-a as described with reference to FIG. 4A.

TABLE 2

| Command | LBA | Systag | CC Entry | Buffer Slot | Systags Link |
| --- | --- | --- | --- | --- | --- |
| Write | 0 | W0 | Miss, Add systag W0 | Allocate 1 | |
| Internal Read | 0 | R | Hit, data not ready | Buffer slot R | Systag R; Systag W0; Systag R |
| Write | 3 | W1 | Systag W0 in CC | Buffer slot 2 | Systag R; Systag W0; Systag W1; Systag R |
| Write | 5 | W2 | Systag W0 inCC | Buffer slot 3 | Systag R; Systag W1; Systag W1; Systag W2; Systag R |

The host system 405 can transmit a write command that includes data for writing at LBA 0 of the memory sub-system. In some examples, LBA 0 can be associated with Systag W0. When the memory sub-system receives the write command, the coherency checker 415 can determine whether any access commands associated with the TU (e.g., the TU that includes LBA 0) are ongoing. That is, the coherency checker 415 can compare LBA 0 with a plurality of systags stored at the table 420 to determine wither an associated systag (e.g., systag W0) is stored at the table. In this example, systag W0 may not be stored in the table 420, which may result in the memory sub-system allocating the first slot 430 in the buffer 425 for linking systags.

Upon the coherency checker 415 determining that systag W0 is not stored to the table 420, the memory sub-system may begin an internal read 410 of the associated TU. During the internal read, systags associated with the TU (e.g., Systags R) can be read and stored to second slot 435 of the buffer. Depending on the particular write commands received from the host system 405, these systags can be linked with the systags stored in first slot 330 of the buffer 425.

As shown in Table 2, the host system 405 may continue transmitting write commands to the memory sub-system. For example, host system 405 can transmit write commands associated with LBAs 3 and 5 to the memory sub-system. In some examples, the write commands may be received by the memory sub-system while the internal read 410 is ongoing. That is, the internal read 410 may last for a duration, and the memory sub-system may continue receiving write commands during the duration. As the memory sub-system receives write commands associated with LBAs 3 and 5, the coherency checker 415 can use the table 420 to determine that an access operation associated with a same TU is ongoing (e.g., by comparing the associated systags with systags stored to the table 420). The memory sub-system may assign the systags to first slot 430 of the buffer 425 based on the operations of the coherency checker 415.

After the host system 405 transmits a write command associated with LBA 5, and the associated systag is assigned to the buffer 425, the memory sub-system may not receive any more access commands associated with the TU. The memory sub-system may then merge the buffer slots (e.g., first slot 430 and second slot 435). That is, because the memory sub-system did not receive a write command associated with each LBA of the TU, the memory sub-system may include (e.g., merge) data read out from the LBAs that did not receive a write command. By merging the buffers, a systag associated with each LBA of the TU can be linked. The systags may be linked by indicating (e.g., pointing) to a prior systag. For example, systag W3 (associated with LBA 3) can point to systag W2, which can point to systag W1, which can point to systag W0. Accordingly, when data is written to the TU, it can be written in sequential order (e.g., based the systag linking). The data associated with each systag may then be written to the TU of the local memory 440.

Figure 4B:
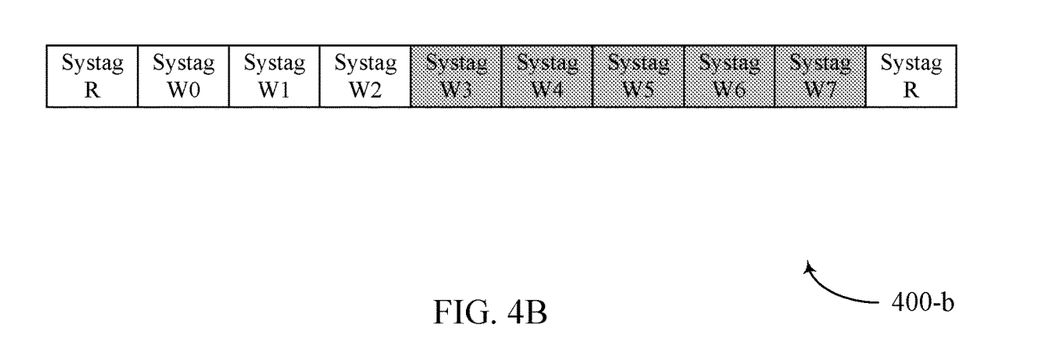
FIG. 4B is an example of linked systags that support linking access commands for a memory sub-system in accordance with some embodiments of the present disclosure.

FIG. 4B illustrates an example of linked systags 400-b that support linking access commands for a memory sub-system in accordance with some embodiments of the present disclosure. The systags can include systag R, and systag W0 through systag W7 as discussed with reference to FIG. 4A. In some examples, each systag is associated with an LBA of a TU. A TU can include, for example, eight (8) LBAs that correspond to systags W0 through W7.

As discussed with reference to FIG. 4A, the host system 405 can transmit a write command that includes data for writing at LBA 0 of the memory sub-system. In some examples, LBA 0 can be associated with Systag W0. When the memory sub-system receives the write command, the coherency checker 415 can determine whether any access commands associated with the TU (e.g., the TU that includes LBA 0) are ongoing. If systag W0 is not be stored in the table 420, the memory sub-system can allocate first slot 430 in the buffer 425 for linking systags.

The host system 405 may continue transmitting write commands to the memory sub-system (e.g., after transmitting data for LBA 0). For example, host system 305 can transmit write commands associated with LBAs 1 and 2 to the memory sub-system. In some examples, the write commands may be received by the memory sub-system while an internal read 410 is ongoing. As the memory sub-system receives write commands associated with LBAs 1 and 2, the coherency checker 415 can use the table 420 to determine that an access operation associated with a same TU is ongoing (e.g., by comparing the associated systags with systags stored to the table 320). The memory sub-system may assign the systags to first slot 430 of the buffer 425 based on the operations of the coherency checker 415.

In some examples, the host system 405 may not transmit write commands associated with LBAs 3 through 7. Instead, the memory sub-system can allocate systags associated with these LBAs based on the internal read 410. That is, the memory sub-system can allocate systags associated with the LBAs to second slot 435 of the buffer 425 and can subsequently merge the buffer entries. For example, the linked systags can include Systag R, which can be associated with the internal read operation 410. The linked list can be a circular linked list such that Systag R is linked with Systag W0 and Systag W7. In the event that the host system 305 does not transmit a write command for LBAs associated with Systags W3, W4, W5, W6, and/or W7, the data can be read from each TU (e.g., during an internal read operation 410) and written to the respective TU due to Systag R being included in the linked list.

After allocating each of the associated systags to the buffer 325 and subsequently merging the buffer entries, the memory sub-system may link each systag associated with the LBAs of the TU. The systags may be linked in a sequential order, where each systag points to a previous systag in the chain. For example, FIG. 3B may illustrate the received (and linked) commands, where Systags W0 through W2 are associated with write commands received from the host system 405 and systags W2 through W7 are associated with the internal read 410. By linking the systags, systag W7 can point to systag W6, which can point to systag W5, and so on. After each of the systags are linked, a single access command can be issued (e.g., an internal access command; an internal write command) and the data associated with each systag may then be written to the TU of the local memory 440.

Figure 5:
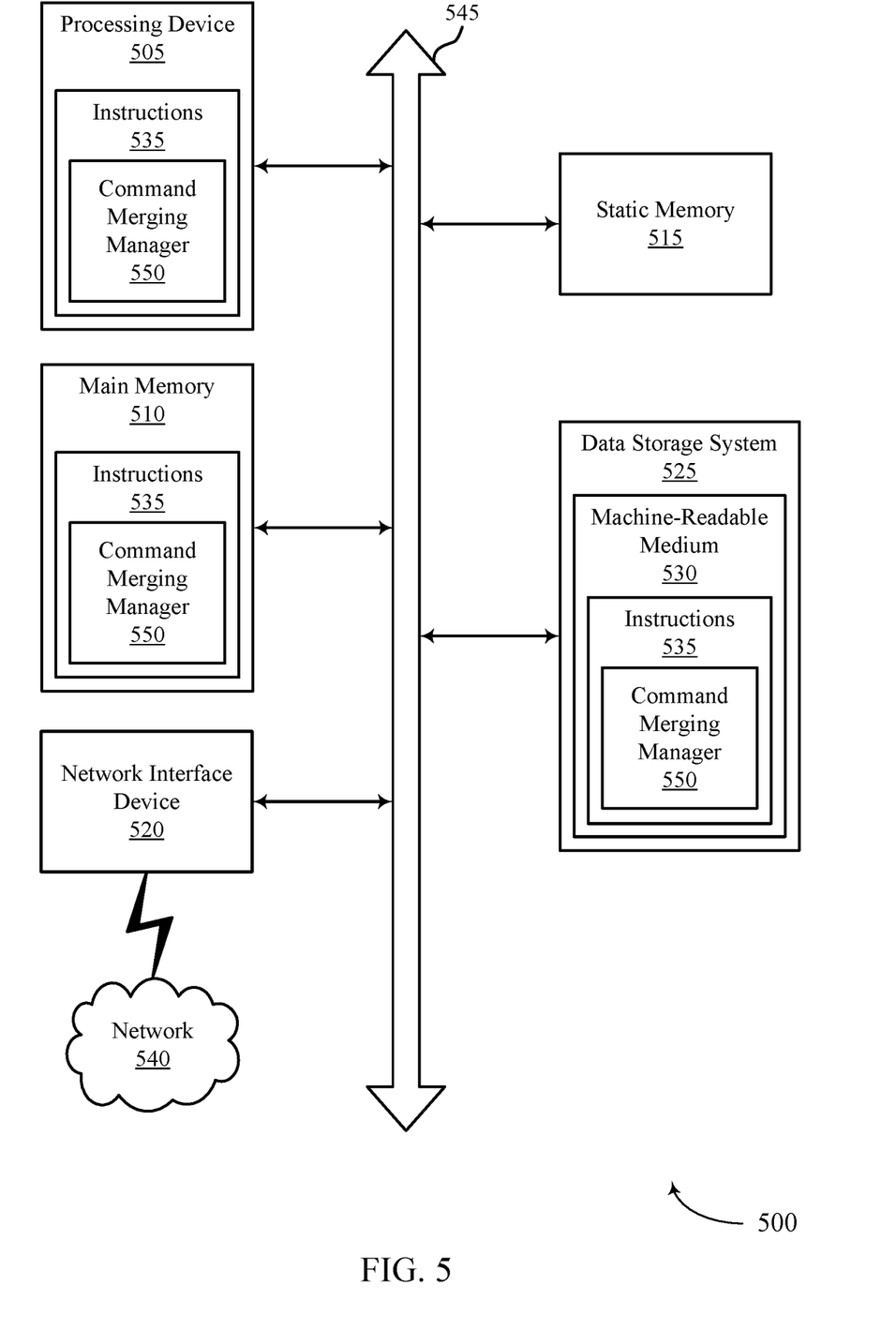
FIG. 5 is an example machine of a computer system that supports linking access commands for a memory sub-system in accordance with some embodiments of the present disclosure.

FIG. 5 illustrates an example machine of a computer system 500 that supports linking access commands for a memory sub-system in accordance with embodiments as disclosed herein. The computer system 500 can include a set of instructions, for causing the machine to perform any one or more of the techniques described herein. In some examples, the computer system 500 can correspond to a host system (e.g., the host system 105 described with reference to FIG. 1) that includes, is coupled with, or utilizes a memory sub-system (e.g., the memory sub-system 110 described with reference to FIG. 1) or can be used to perform the operations of a controller (e.g., to execute an operating system to perform operations corresponding to the command merging manager 150 described with reference to FIG. 1). In some examples, the machine can be connected (e.g., networked) with other machines in a local area network (LAN), an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" can also include any collection of machines that individually or jointly execute a set (or multiple sets) of instructions to perform any one or more of the methodologies discussed herein.

The example computer system 500 can include a processing device 505, a main memory 510 (e.g., ROM, flash memory, DRAM such as SDRAM or Rambus DRAM (RDRAM), etc.), a static memory 515 (e.g., flash memory, static RAM (SRAM), etc.), and a data storage system 525, which communicate with each other via a bus 545.

Processing device 505 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 505 can also be one or more special-purpose processing devices such as an ASIC, an FPGA, a DSP, network processor, or the like. The processing device 505 is configured to execute instructions 535 for performing the operations and steps discussed herein. The computer system 500 can further include a network interface device 520 to communicate over the network 540.

The data storage system 525 can include a machine-readable storage medium 530 (also known as a computer-readable medium) on which is stored one or more sets of instructions 535 or software embodying any one or more of the methodologies or functions described herein. The instructions 535 can also reside, completely or at least partially, within the main memory 510 and/or within the processing device 505 during execution thereof by the computer system 500, the main memory 510 and the processing device 505 also constituting machine-readable storage media. The machine-readable storage medium 530, data storage system 525, and/or main memory 510 can correspond to a memory sub-system.

In one example, the instructions 535 include instructions to implement functionality corresponding to a command merging manager 550 (e.g., the command merging manager 150 described with reference to FIG. 1). While the machine-readable storage medium 530 is shown as a single medium, the term "machine-readable storage medium" can include a single medium or multiple media that store the one or more sets of instructions. The term "machine-readable storage medium" can also include any medium that is capable of storing or encoding a set of instructions for execution by the machine and that cause the machine to perform any one or more of the methodologies of the present disclosure. The term "machine-readable storage medium" can include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, ROMs, RAMs, EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some examples, a machine-readable (e.g., computer-readable) medium includes a machine (e.g., a computer) readable storage medium such as ROM, RAM, magnetic disk storage media, optical storage media, flash memory components, etc.

In the foregoing specification, examples of the disclosure have been described with reference to specific example examples thereof. It will be evident that various modifications can be made thereto without departing from the broader spirit and scope of examples of the disclosure as set forth in the following claims. The specification and drawings are, accordingly, to be regarded in an illustrative sense rather than a restrictive sense.

What is claimed is:

1. A method, comprising:
   receiving, from a host system, a first write command comprising first data for writing at a first address of a transfer unit of a memory sub-system, the first write command being associated with a first identifier;
   issuing an internal read command to retrieve data stored in the transfer unit of the memory sub-system based at least in part on receiving the first write command;
   receiving, from the host system, a second write command comprising second data for writing at a second address of the transfer unit of the memory sub-system, the second write command being associated with a second identifier;
   determining that the internal read command is ongoing based at least in part on receiving the second write command;
   linking the first identifier with the second identifier based at least in part on determining that the internal read command is ongoing; and
   issuing an internal write command that includes the first data associated with the first write command and the second data associated with the second write command based at least in part on linking the first identifier with the second identifier.

2. The method of claim 1, further comprising:
   comparing the second identifier with identifiers of a plurality of transfer units stored in a write buffer based at least in part on receiving the second write command; and
   determining that the second identifier is stored in the write buffer, wherein issuing the internal read command is based at least in part on determining that the second identifier is stored in the write buffer.

3. The method of claim 2, further comprising:
   storing the first data and the second data to the write buffer based at least in part on receiving the second write command, wherein linking the first identifier with the second identifier is based at least in part on storing the first data and the second data to the write buffer.

4. The method of claim 1, further comprising:
   allocating the first identifier to the first write command based at least in part on the first address, wherein issuing the internal read command is based at least in part on allocating the first identifier; and
   allocating the second identifier to the second write command based at least in part on the second address, wherein linking the first identifier with the second identifier is based at least in part on allocating the second identifier.

5. The method of claim 1, further comprising:
   receiving, from the host system, a third write command comprising third data for writing at a third address of the transfer unit of the memory sub-system, the third write command being associated with a third identifier; and
   linking the third identifier with the first identifier and the second identifier, wherein the internal write command includes the third data associated with the third write command.

6. The method of claim 1, wherein the internal read command initiates an internal read operation lasting for a duration, the method further comprising:
   identifying that the internal read operation is completed, wherein issuing the internal write command occurs after the duration and is based at least in part on identifying that the internal read operation is completed.

7. The method of claim 6, wherein the second write command is received during the duration.

8. The method of claim 1, further comprising:
   receiving, from the host system, a write command for writing at an address of a second transfer unit of the memory sub-system, wherein issuing the internal write command is based at least in part on receiving the write command for writing at the address of the second transfer unit.

9. The method of claim 1, further comprising:
receiving, from the host system, a plurality of write commands comprising data for the memory sub-system after issuing the internal read command, each of the plurality of write command being associated with a respective identifier; and
linking each of the respective identifiers with the first identifier and the second identifier based at least in part on receiving the plurality of write commands, wherein the internal write command includes the data associated with each of the plurality of write commands received from the host system.

10. The method of claim 9, wherein each of the respective identifiers indicates a sequential address of the transfer unit of the memory sub-system for writing data, the method further comprising:
identifying at least one respective identifier that is received in a non-sequential order; and
ordering each of the respective identifiers in a sequential order based at least in part on identifying the at least one respective identifier that is received in the non-sequential order, wherein linking each of the respective identifiers with the first identifier and the second identifier comprises linking the respective identifiers in the sequential order.

11. The method of claim 1, wherein the first address and the second address are sequential logical block addresses of the transfer unit.

12. A system comprising:
a plurality of memory components; and
a processing device, operatively coupled with the plurality of memory components, to:
receive, from a host system, a first write command comprising first data for writing at a first address of a transfer unit of a memory sub-system, the first write command being associated with a first identifier;
issue an internal read command to retrieve data stored in the transfer unit of the memory sub-system based at least in part on receiving the first write command;
receive, from the host system, a second write command comprising second data for writing at a second address of the transfer unit of the memory sub-system, the second write command being associated with a second identifier;
determine that the internal read command is ongoing based at least in part on receiving the second write command;
link the first identifier with the second identifier based at least in part on determining that the internal read command is ongoing; and
issue an internal write command that includes the first data associated with the first write command and the second data associated with the second write command based at least in part on linking the first identifier with the second identifier.

13. The system of claim 12, further comprising:
the processing device to:
compare the second identifier with identifiers of a plurality of transfer units stored in a write buffer based at least in part on receiving the second write command; and
determine that the second identifier is stored in the write buffer, wherein issuing the internal read command is based at least in part on determining that the second identifier is stored in the write buffer.

14. The system of claim 13, further comprising:
the processing device to:
store the first data and the second data to the write buffer based at least in part on receiving the second write command, wherein linking the first identifier with the second identifier is based at least in part on storing the first data and the second data to the write buffer.

15. The system of claim 12, further comprising:
the processing device to:
allocate the first identifier to the first write command based at least in part on the first address, wherein issuing the internal read command is based at least in part on allocating the first identifier; and
allocate the second identifier to the second write command based at least in part on the second address, wherein linking the first identifier with the second identifier is based at least in part on allocating the second identifier.

16. The system of claim 12, further comprising:
the processing device to:
receive, from the host system, a third write command comprising third data for writing at a third address of the transfer unit of the memory sub-system, the third write command being associated with a third identifier; and
link the third identifier with the first identifier and the second identifier, wherein the internal write command includes the third data associated with the third write command.

17. The system of claim 12, wherein the internal read command initiates an internal read operation lasting for a duration and the processing device is further to:
identify that the internal read operation is completed, wherein issuing the internal write command occurs after the duration and is based at least in part on identifying that the internal read operation is completed.

18. The system of claim 17, wherein the second write command is received during the duration.

19. The system of claim 12, further comprising:
the processing device to:
receive, from the host system, a write command for writing at an address of a second transfer unit of the memory sub-system, wherein issuing the internal write command is based at least in part on receiving the write command for writing at the address of the second transfer unit.

20. A non-transitory computer-readable storage medium comprising instructions that, when executed by a processing device, cause the processing device to:
receive, from a host system, a first write command comprising first data for writing at a first address of a transfer unit of a memory sub-system, the first write command being associated with a first identifier;
issue an internal read command to retrieve data stored in the transfer unit of the memory sub-system based at least in part on receiving the first write command;
receive, from the host system, a second write command comprising second data for writing at a second address of the transfer unit of the memory sub-system, the second write command being associated with a second identifier;

determine that the internal read command is ongoing based at least in part on receiving the second write command;

link the first identifier with the second identifier based at least in part on determining that the internal read command is ongoing; and issue an internal write command that includes the first data associated with the first write command and the second data associated with the second write command based at least in part on linking the first identifier with the second identifier.

\* \* \* \* \*